June 25, 1929.　　　T. WERTHMAN　　　1,718,444
LOADING ATTACHMENT FOR TRACTORS
Filed March 21, 1928　　　6 Sheets-Sheet 1
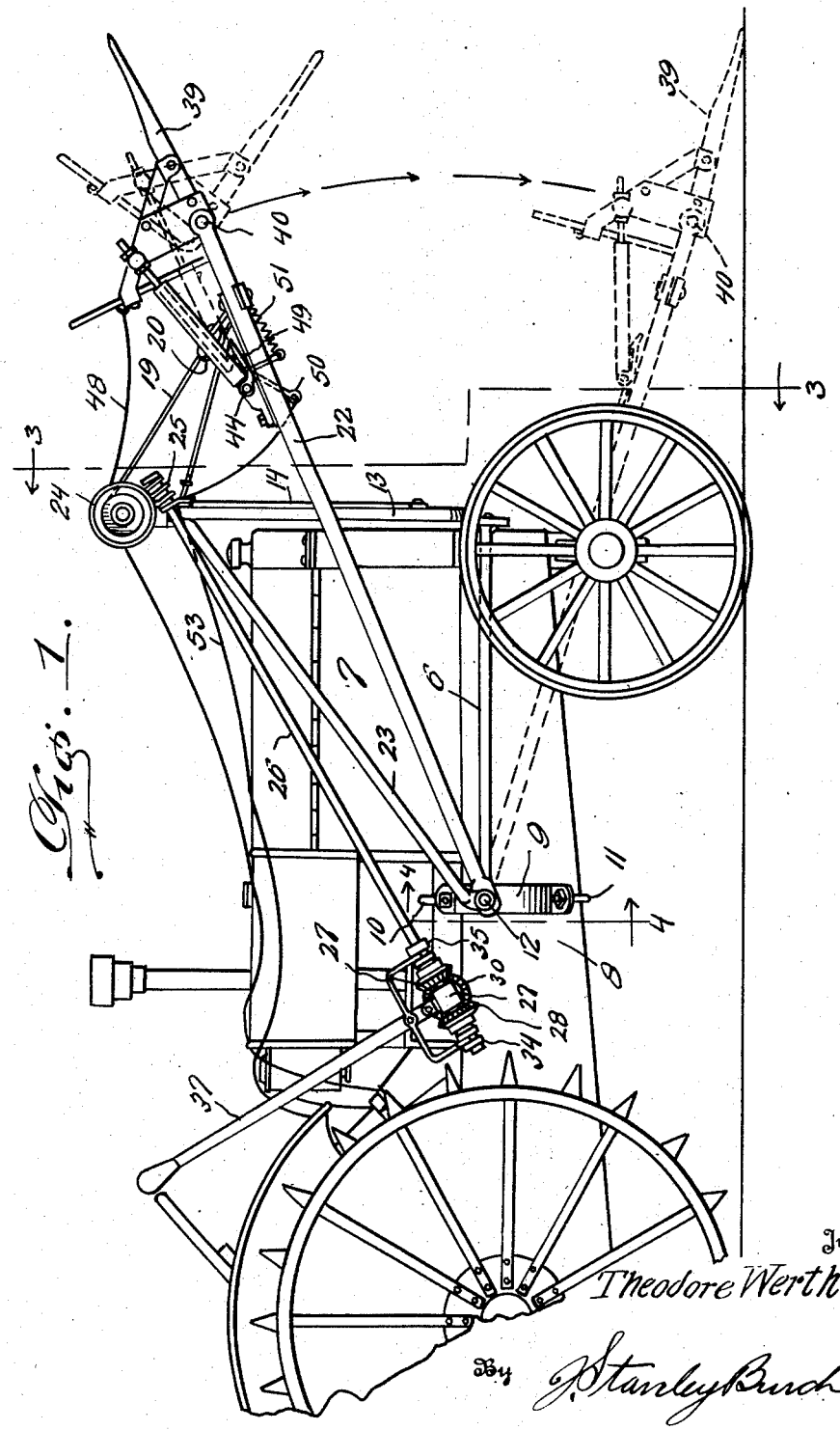
Inventor
Theodore Werthman,
By J. Stanley Burch
Attorney

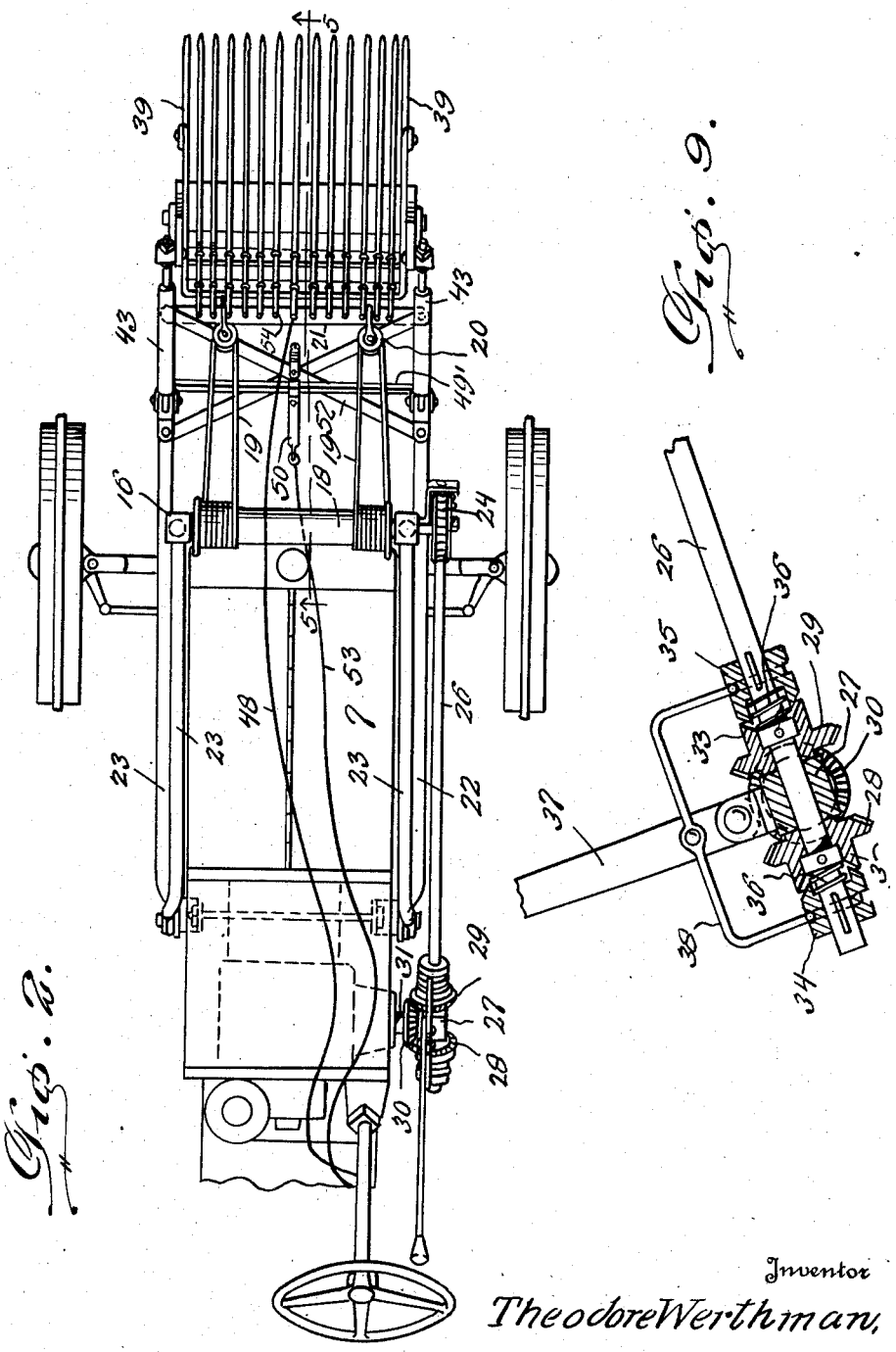

June 25, 1929.  T. WERTHMAN  1,718,444
LOADING ATTACHMENT FOR TRACTORS
Filed March 21, 1928   6 Sheets-Sheet 3
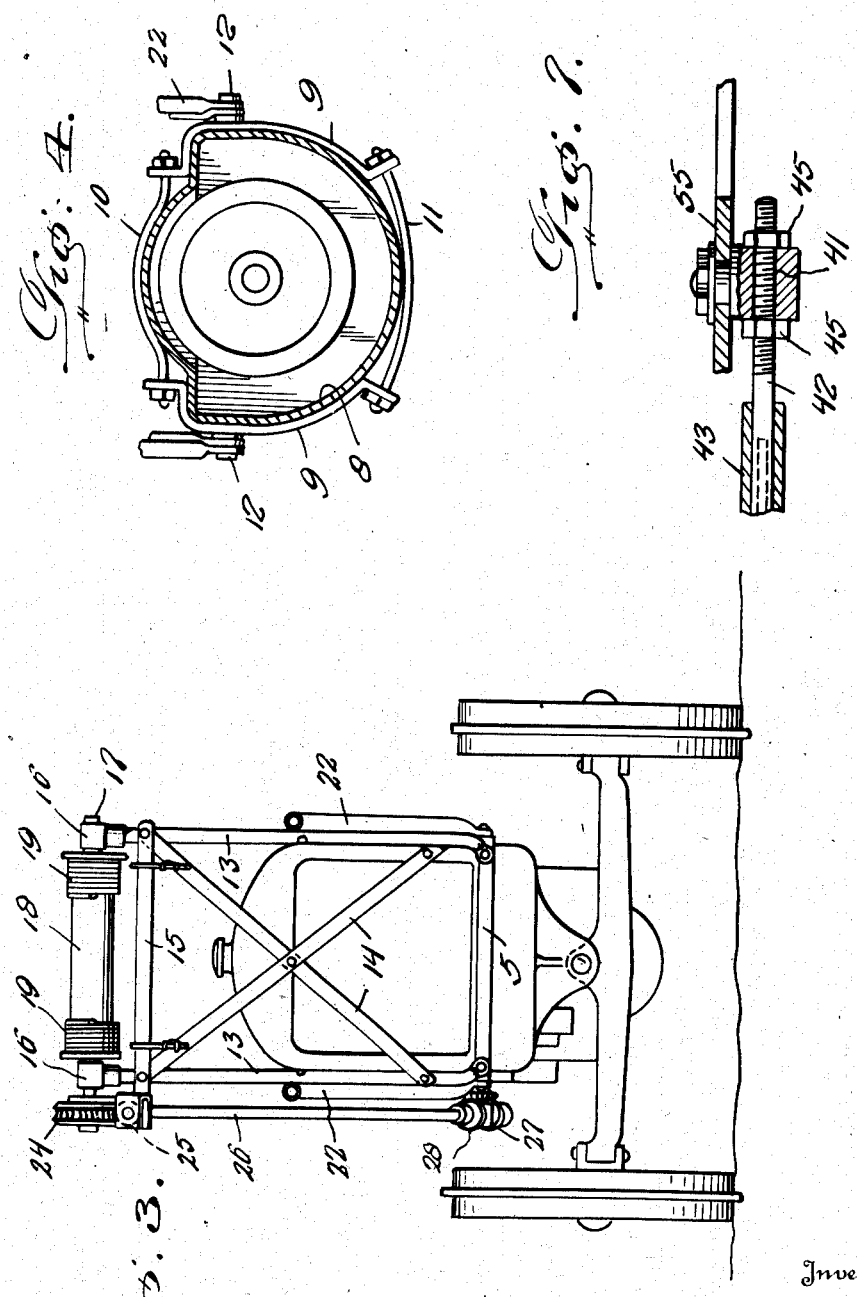

June 25, 1929. T. WERTHMAN 1,718,444
LOADING ATTACHMENT FOR TRACTORS
Filed March 21, 1928    6 Sheets-Sheet 4
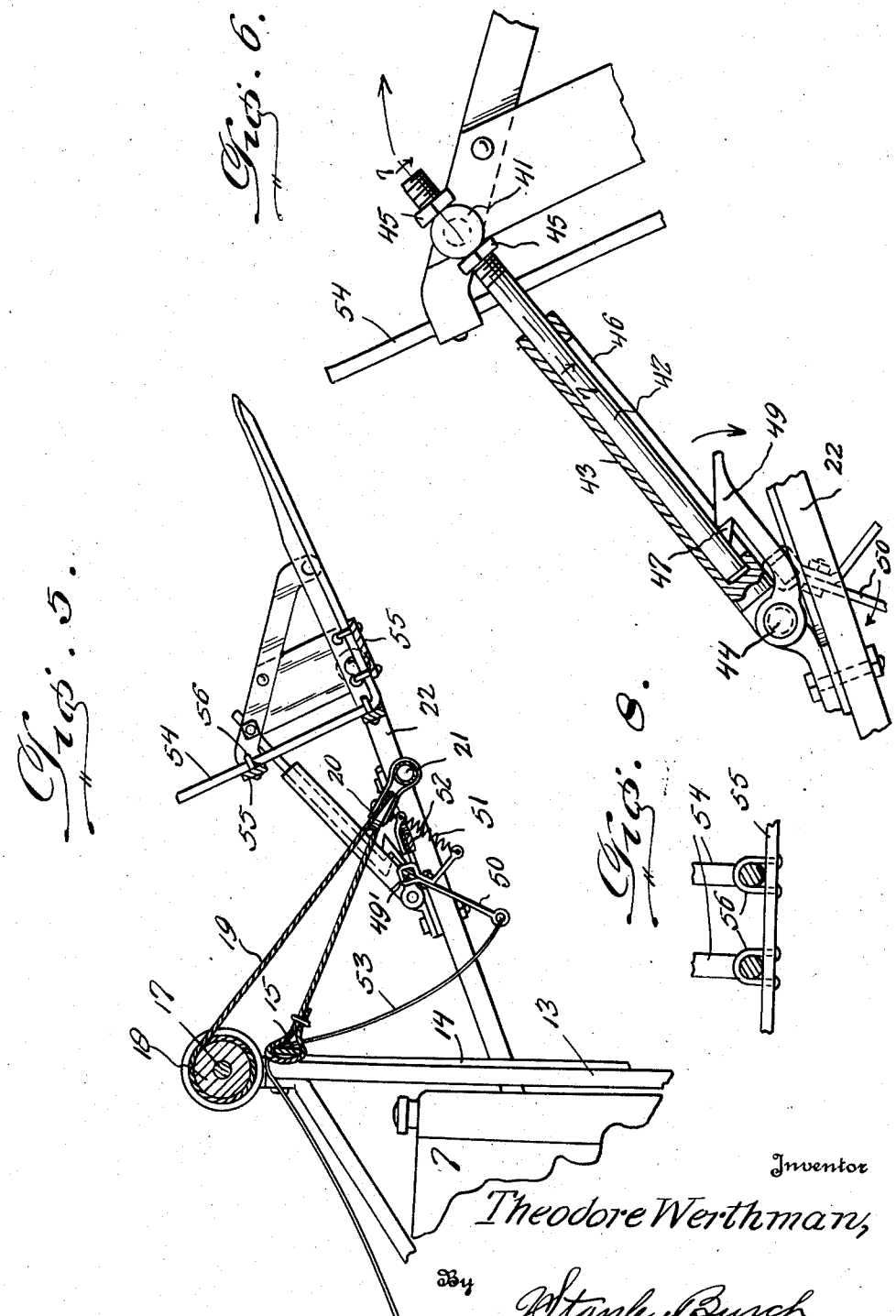
Inventor
Theodore Werthman,
By J. Stanley Burch
Attorney

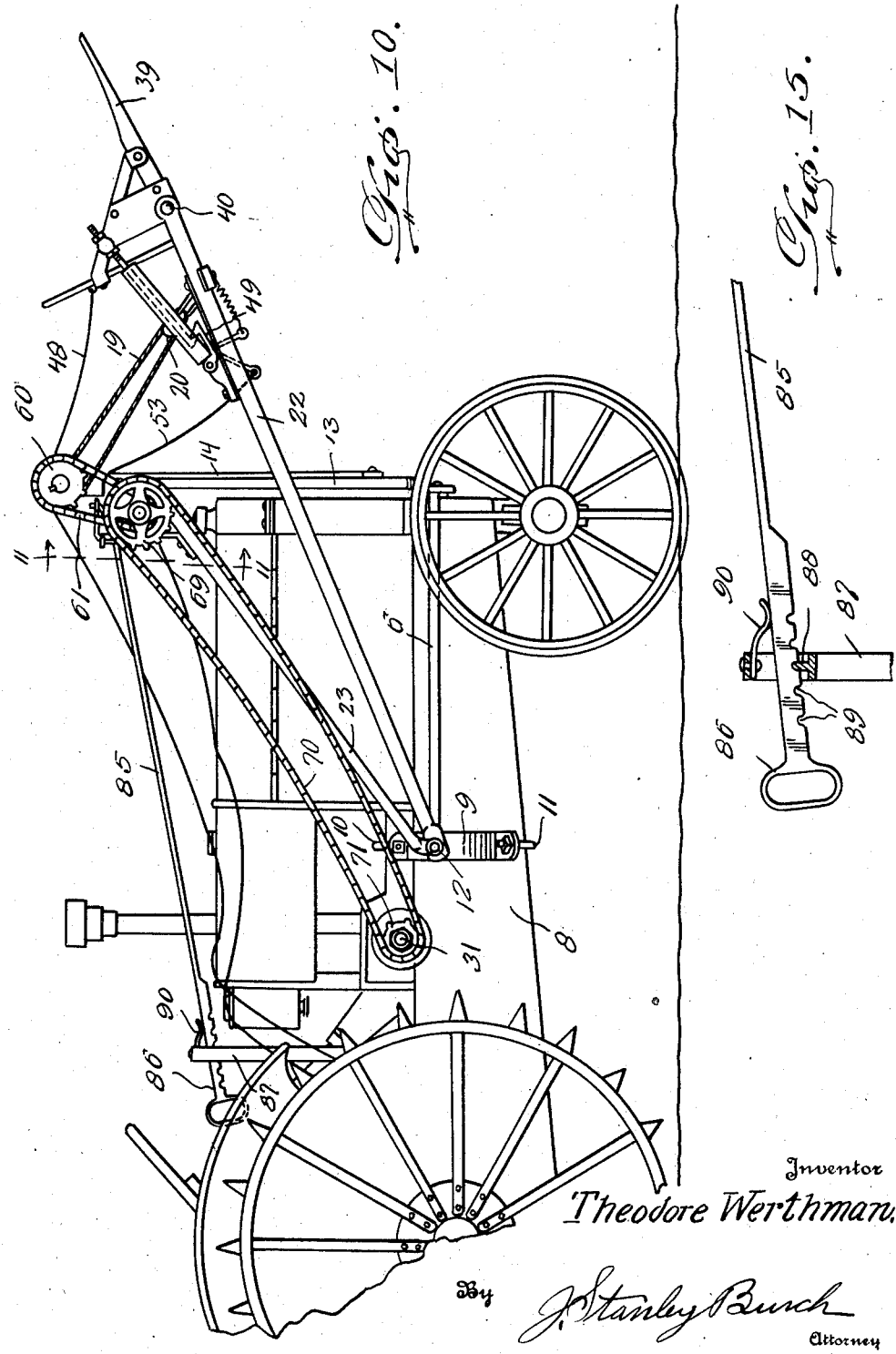

June 25, 1929.  T. WERTHMAN  1,718,444
LOADING ATTACHMENT FOR TRACTORS
Filed March 21, 1928    6 Sheets-Sheet 6
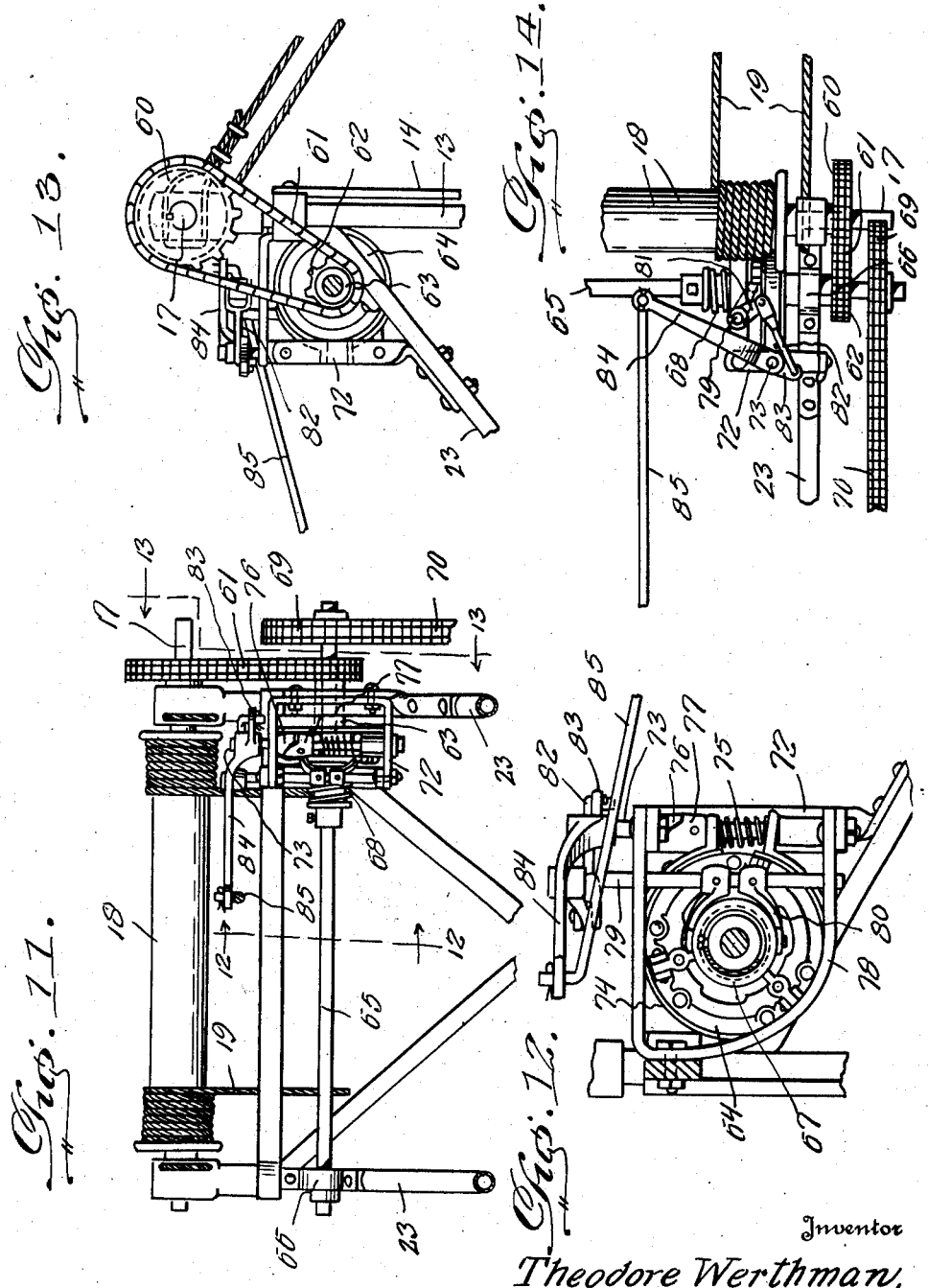
Inventor
Theodore Werthman,
By J. Stanley Bruch
Attorney Patented June 25, 1929.

1,718,444

UNITED STATES PATENT OFFICE.

THEODORE WERTHMAN, OF CHEROKEE, IOWA.

LOADING ATTACHMENT FOR TRACTORS.

Application filed March 21, 1928. Serial No. 263,573.

The present invention relates to loading attachments for tractors, and has more particular reference to the provision of improved means adapted for application to a conventional form of tractor so that the same may be employed for general loading purposes.

The primary object of the present invention is to provide an improved attachment of the above kind embodying a loading scoop or the like adapted to be forced into and filled with the material to be loaded upon forward propulsion of the tractor, power-operated means to elevate the scoop and permit the load to be transported by the tractor to the desired point of deposit, and manually-controlled means to trip the scoop and effect dumping of the load.

A further object is to provide simple and efficient means for raising and lowering the scoop and adapted to be driven from the usual power take-off shaft of the tractor.

A still further object is to provide an improved attachment of the above kind which may be conveniently controlled by the operator of the tractor, all controls being within reach of the driver's seat.

Another object is to provide efficient means for holding the scoop in loading position, and reliable manually operable means for releasing said holding means and permitting the scoop to tilt and dump its load.

Still another object is to provide an attachment of the above kind which is simple and durable in construction, efficient in use, and capable of ready application to a tractor without alteration or modification of the tractor construction.

Other objects will appear as the nature of the invention is better understood, and the same consists in the novel form, combination and arrangement of parts hereinafter more fully described, shown in the accompanying drawings and claimed.

In the drawing:

Figure 1 is a side elevational view of a tractor having attached thereto a loading device embodying the present invention.

Figure 2 is a fragmentary top plan view thereof.

Figure 3 is a vertical section taken on line 3—3 of Figure 1.

Figure 4 is a transverse section on line 4—4 of Figure 1.

Figure 5 is a fragmentary vertical longitudinal section on line 5—5 of Figure 2.

Figure 6 is an enlarged fragmentary view, partly in side elevation and partly in section, showing details of the means for holding the scoop in loading position.

Figure 7 is a section on line 7—7 of Figure 6.

Figure 8 is a fragmentary horizontal section through the back of the loading fork.

Figure 9 is an enlarged fragmentary view, partly in side elevation and partly in section, showing details of the means for operating the scoop raising and lowering mechanism from the usual power take-off shaft of the tractor.

Figure 10 is a view similar to Figure 1, illustrating a preferred modification of the present invention.

Figure 11 is a fragmentary transverse section on line 11—11 of Figure 10.

Figure 12 is a fragmentary vertical section on line 12—12 of Figure 11.

Figure 13 is a vertical section on line 13—13 of Figure 11.

Figure 14 is a fragmentary top plan view of the construction shown in Figure 11; and Figure 15 is an enlarged fragmentary detail view, partly in section and partly in side elevation, showing the control lever of Figure 10.

The drawings illustrate preferred forms of the invention which have been successfully constructed and operated, but it is to be understood that minor changes may be made without departing from the spirit of the invention. Moreover, although the machine is shown equipped with a fork for manure loading and the like, it is apparent that a shovel or other form of scoop may be substituted.

In the construction illustrated in Figures 1 to 9 inclusive, a supporting frame is provided including a horizontal U-shaped base member adapted to snugly embrace the lower front portion of the tractor body and composed of an intermediate portion 5 adapted to be suitably secured to and to extend across the front end of the tractor body, and rearwardly projecting legs 6 adapted to extend along the sides of the tractor body to a point slightly to the rear of the engine hood 7 of the tractor. Embracing the transmission housing 8 of the tractor is a removable clamping band preferably composed of a pair of side strap members 9 connected by top and bottom bolts 10 and 11 and having the rear ends of the legs 6 of the base member secured thereto as at 12. Rigidly secured to and rising from the ends of the front portion 5 of the base member are standards 13 rigidly connected by crossed braces 14 and an upper horizontal connecting bar 15, and having bearings 16 on their upper ends in which is journaled a shaft 17 having a winding drum 18 secured thereon between the standards.

Secured to the drum 18 are two hoisting cables 19 which extend forwardly and pass around guides 20 attached to a cross bar 21 which connects the front ends of a pair of vertically swinging scoop-carrying push-bars or arms 22. The cables 19 extend rearwardly from the guides 20 and attach to the connecting bar 15, while the rear ends of the arms 22 are pivoted at the points 12 to the side straps 9 of the clamping band. The supporting frame further includes rearwardly inclined braces 23 whose forward upper ends are rigidly secured to the upper ends of the standards 13 and whose rear lower ends are attached at the points 12 to the side straps 9 of the clamping band.

Secured on one end of the drum shaft 17 is a worm gear 24 which meshes with a worm 25 on the forward upper end of a rearwardly inclined longitudinal shaft 26 whose rear lower end portion is suitably supported by the tractor through the medium of a bearing 27. Journaled on the shaft 26 and confined at opposite sides of the bearing 27 are bevel gears 28 and 29 which constantly mesh with a bevel gear 30 secured on the projecting end of the usual transverse power take-off shaft 31 of the tractor, and the outer ends of the hubs of the gears 28 and 29 are provided with clutch elements 32 and 33 adapted to be respectively engaged by clutch elements on the inner ends of collars 34 and 35 slidably keyed on the shaft 26 as shown in Figure 9. The latter clutch elements are normally disengaged by springs 36 so that the gears 28 and 29 run idle. A control lever 37 is pivoted to the bearing 27 and carries a pivoted clutch shifting rod 38 having forks engaging the collars 34 and 35. When the shaft 31 is driven and the clutch element of collar 34 is in, the shaft 26 will be rotated in one direction, and when the clutch element of collar 35 is in, the shaft 26 will be rotated in the opposite direction. It is thus apparent that the drum 18 may be driven at will to wind or unwind the cables 19 and raise or lower the scoop-carrying arms 22.

A scoop 39 is pivoted at 40 to and between the forward ends of the arms 22, and swiveled to and projecting laterally from the sides of the scoop are pins 41 through which are slidably disposed the threaded forward ends of rods 42 which project rearwardly and slide in tubes 43 hinged at 44 to the arms 22. Nuts 45 are adjustably threaded on the rods 42 at opposite sides of the pins 41, and provided in the lower sides of the tubes 43 are longitudinal elongated slots 46 in which are slidable depending keeper and stop lugs 47 provided on the rear ends of the rods 42. It is thus apparent that extensible link connections are provided between the scoop 39 and the arms 22 to permit limited vertical swinging of the scoop so that it may be positioned as shown by full lines in Figures 1, 5 and 6 to receive and retain a load, or allowed to tilt forwardly as shown by dotted lines in Figure 1 to dump the load. By adjusting the nuts 45, the effective length of the link connections may be set to secure best results, and attached to the back of the scoop is a rope 48 adapted to be pulled rearwardly to return the scoop to loading position after being dumped, the rope 48 being extended rearwardly over the drum 18 to a point adjacent the lever 37 within convenient reach of the operator of the tractor.

To normally hold the scoop against dumping, but to permit it to tilt forwardly and dump when desired, I provide a pair of latches 49 that are pivoted at 44 and secured on the ends of rod shaft 49' which is disposed transversely of the arms 22, said latches being arranged to engage the keeper lugs 47. An arm 50 is secured on the rod 49' and a tension spring 51 connects this arm with crossed braces 52 between the arms 22 for raising the rod 49' and engaging the latches. For releasing these latches, a rope 53 is attached to the arm 50 and extended over the bar 15 to a point adjacent the lever 37, whereby a rearward pull on said rope 53 will effect downward movement of rod 49' and release the latches 49 from the lugs 47 so as to permit the scoop to tilt and dump its load. The lugs 47 and latches 49 have beveled edges so that the lugs may automatically snap behind the latches when the scoop is righted.

It is noted the scoop is so pivoted that it normally swings to dumping position by gravity, and the swinging movement in this direction is limited by engagement of the lugs 47 with the forward end walls of the slots 46.

In the embodiment illustrated, the scoop 39 is in the form of a manure fork composed of a plurality of spaced parallel L-shaped bars 54 rigidly connected by transverse straps 55 having staples 56 riveted thereto and embracing the bars 54.

In operation, the machine is propelled forwardly with the scoop 39 lowered, whereby to load the latter. The lever 37 is then operated to clutch one of the gears 28 and 39 to the shaft 26, thereby driving the drum 18 and causing the cables to swing the arms 22 upwardly. The gear is then unclutched from shaft 26 and the machine is then again propelled to position the raised and loaded scoop over a wagon, manure spreader or the like, whereupon the rope 53 is pulled to release the latches 49 and permit the scoop to dump the load. The rope 48 is then pulled to right the scoop and latch it in loading position, so that when the arms 22 are again lowered by clutching the other gear to shaft 26, the machine is ready for reloading.

In the construction illustrated in Figures 10 to 15 inclusive, a sprocket wheel 60 is secured on one end of the drum shaft 17 and is operatively connected by a sprocket chain 61 to a further relatively small sprocket wheel 62 secured on the hub 63 of the casing of a conventional multiple-disk clutch 64. The casing of the clutch 64 is mounted on a transverse horizontal counter shaft 65 so that the latter may freely rotate therein when the clutch is released, and the inner disk carrying element of the clutch is fixed on the shaft 65 to turn therewith so that the casing of the clutch will be rotated to turn the drum 18 when said clutch is engaged. As shown, the shaft 65 is mounted below the drum 18 in bearings 66 secured on the inclined braces 23, and slidable on the shaft 65 is a clutch collar 67 which is yieldingly urged to the right of Figure 11 by a helical compression spring 68 to normally engage or apply the clutch.

Secured on one end of the counter shaft 65 is a large sprocket wheel 69 which is constantly connected by a sprocket chain 70 with a sprocket wheel 71 secured on the projecting end of the usual transverse power take-off shaft 31 of the tractor. Journaled in a bracket 72 secured to the supporting frame is a vertical rock shaft 73 which freely passes through the ends of a brake band 74 embracing the periphery of the casing of clutch 64. The ends of this brake band are normally separated by a spring 75 to release the brake band and permit the clutch casing to freely turn therein. Fixed to the rock shaft 73 is a cam 76 which cooperates with a cam 77 on the upper end of the brake band for applying the latter when the shaft 73 is turned to the right from the position of Figures 11, 12 and 14.

Journaled in a further bracket 78 secured to the supporting frame and to the bracket 72 is a second vertical rock shaft 79 on which is fixed a fork 80 engaging the clutch collar 67. A lever 81 is secured on the upper end of the rock shaft 79 and operatively connected by a link 82 with a short arm 83 of a lever 84 which is fixed on the upper end of the rock shaft 73 and has a pull rod 85 connected to its longer inwardly projecting arm. This arrangement is such that when the rod 85 is pulled rearwardly a given distance, the clutch collar 67 will be shifted against the action of spring 68 to release the clutch 64, thereby permitting the shaft 65 to rotate without driving the clutch casing and the drum 18 and allowing the latter to turn freely so that the cables 19 may unwind therefrom, with the scoop or fork 39 automatically lowering by gravity, if raised. The arrangement is further such that when the rod 85 is pulled rearwardly a greater distance the clutch will remain released and the brake band will be applied to hold the clutch casing and drum 18 against turning, thereby holding the scoop or fork 39 in the position to which it may have been raised or lowered. In any event, the brake is only applied when the clutch is released, and the clutch is only applied when the brake is released. This permits continuous driving of shaft 65 and continuous operation of the tractor engine, even though the scoop is only raised or lowered at different intervals as required in the use of the apparatus.

As shown in Figures 11 to 15 inclusive, the clutch is engaged and the brake is released, so that when the tractor engine is placed into operation, the drum 18 will be rotated to elevate the scoop to the position of Figure 10. The pull rod 85 extends rearwardly to a point within convenient reach of the driver's seat, where it is provided with a control lever or handle 86 loosely slidable through a guide slot in the upper end of a suitable supporting post or upright 87 fixed upon the tractor frame. This post has a tooth 88 within the slot arrangement to selectively engage in notches 89 provided in the lower edge of the lever or handle 86, whereby to releasably hold the latter in any of its adjusted positions. A spring 90 holds the lever 86 in engagement with the tooth 88, and by lifting said lever against the action of the spring 90, it may be disengaged from the tooth 88 and moved to operate the clutch and brake. Otherwise, the construction of Figures 10 to 15 inclusive is substantially the same as that of Figures 1 to 9 inclusive, and like reference characters are used to indicate corresponding parts in both instances.

In the operation of the embodiment of the invention shown in Figures 10 to 15 inclusive, the machine is propelled forwardly with the scoop 39 lowered and with the lever 86 pulled rearwardly so that the clutch 64 is released and the brake band 74 is applied to hold the scoop slightly above the ground. After the scoop is loaded in this position, the lever 86 is raised and pushed forwardly to release the brake band 74 and engage the clutch 64, thereby driving the drum 18 and causing the arms 22 to swing upwardly and raise the scoop. The lever 86 is then pulled rearwardly to release the clutch 64 and apply the brake so that the loaded scoop is held in raised position, whereupon, the machine is propelled to position the raised and loaded scoop over a wagon or the like for having the load of the scoop dumped therein as described above in connection with the embodiment of Figures 1 to 9 inclusive. After the load has been dumped and the scoop has again been righted, the lever 86 is moved partly forward, so as to release the brake band 74 without engaging the clutch 64, thereby permitting the scoop to again lower by gravity. When the scoop has lowered far enough the lever 86 is pulled rearwardly to apply the brake band 74 and hold the scoop in position for reloading.

Devices constructed substantially as shown and described may be easily and economically manufactured and may be quickly applied to a conventional tractor to convert it into a self-propelled loading machine without changing the tractor construction, the attachment being operated from power derived from the engine of the tractor.

Minor changes may be made without departing from the spirit and scope of the invention as claimed.

What I claim as new is:

1. A hoisting machine comprising a frame, a vertically swinging arm pivoted thereto, a scoop pivoted to the free end of said arm, an extensible link connection between the back of the scoop and said arm adjacent but rearwardly of the scoop pivot, and release means associated with said link connection for normally retaining the latter contracted and thereby holding the scoop against dumping.

2. A hoisting machine comprising a frame, a vertically swinging arm pivoted thereto, a scoop pivoted to the free end of said arm, an extensible link connection between the back of the scoop and said arm adjacent but rearwardly of the scoop pivot, release means associated with said link connection for normally holding the scoop against dumping, said release means embodying a latch pivoted to said arm, said link connection embodying a tube having a longitudinal slot and a rod slidable in the tube and having a keeper lug movable in said slot and engageable by said latch.

3. A hoisting machine comprising a frame, a vertically swinging hoisting arm pivoted thereon, a pivoted scoop carried by the free end of said arm, and releasable means to normally hold said scoop against dumping including a pivoted latch on the arm and an extensible link connection between the scoop and said arm embodying a rod attached to the scoop and having a keeper lug engageable by said latch.

4. A hoisting machine comprising a frame, a vertically swinging hoisting arm pivoted thereon, a pivoted scoop carried by the free end of said arm, releasable means to normally hold said scoop against dumping including a pivoted latch on the arm and an extensible link connection between the scoop and said arm embodying a rod attached to the scoop and having a keeper lug engageable by said latch, and means to swing said latch downwardly out of engagement with said keeper lug.

5. A hoisting machine comprising a frame, a vertically swinging hoisting arm pivoted thereon, a pivoted scoop carried by the free end of said arm, releasable means to normally hold said scoop against dumping including a pivoted latch on the arm and an extensible link connection between the scoop and said arm embodying a rod attached to the scoop and having a keeper lug engageable by said latch, and means to swing said latch downwardly out of engagement with said keeper lug, including an arm rigidly connected to the latch and having a pull rope attached thereto.

6. A hoisting machine comprising a frame, a vertically swinging hoisting arm pivoted thereon, a pivoted scoop carried by the free end of said arm, releasable means to normally hold said scoop against dumping including a pivoted latch on the arm and an extensible link connection between the scoop and said arm embodying a rod attached to the scoop and having a keeper lug engageable by said latch, and a pull rope attached to the back of the scoop for returning the latter to normal position after dumping.

7. A hoisting machine comprising a frame, a pair of vertically swinging arms mounted on said frame, a tilting scoop on the front ends of said arms, scoop holding latches on said arms, bars rigidly connecting said latches, and means for lowering said bar to release said latches.

8. A hoisting machine comprising a frame, a pair of vertically swinging arms mounted on said frame, a tilting scoop on the front ends of said arms, scoop holding latches on said arms, bars rigidly connecting said latches, and means for lowering said bar to release said latches, including an arm rigid with the bar and having a pull member attached thereto.

In testimony whereof I affix my signature.

THEODORE WERTHMAN.